INVENTOR
RALPH C. IMMEL
BY
ATTORNEYS

United States Patent Office 3,019,031
Patented Jan. 30, 1962

3,019,031
MUD FLAPS
Ralph C. Immel, 5530 Palomar Lane, Dallas, Tex.
Filed Nov. 14, 1960, Ser. No. 68,879
4 Claims. (Cl. 280—154.5)

This invention relates to mud flaps for trucks adapted to be suspended from the bottom of a truck body adjacent and in rear of the rear wheels of the truck.

In most localities, trucks are required to be provided with such mud flaps, but most flaps heretofore provided have been made of rubber or fibre or some other flexible material, and as they are generally made of tearable material they soon become torn or worn out and consequently fall off the truck, the main cause of such failure occurring when the truck is backing into curbings or the like and the flap is pinched between the wheel and curb causing stretching thereof.

The principal object of my invention is to provide a novel flap preferably formed of resilient rubber which will be relatively stiff, although somewhat deformable, and would be securely attached to the underside of the truck body so that same will not become readily detached from the body as when the truck is backing into a curbing, my novel mud flap being provided with rows of transverse offset slits whereby the same will be substantially impervious to rocks, gravel and water, while at the same time said flap will be sufficiently elastic to avoid ready tearing thereof due to pinching and stretching thereof even when the truck is backing into a curb, and furthermore will not tear at the attachment or weakest point under such stresses.

A further object of the invention is to provide a resilient rubber mud flap of the above type having horizontally disposed rows of offset slits therein which will permit elongation of the body of the flap while still maintaining sufficient elasticity to avoid easy tearing, the slits being sufficiently small so that the flap will be substantially impervious to rocks, gravel and water, and the body of the flap returning to its normal shape and size when the pinching and stretching stresses are removed.

I will explain the invention with reference to the accompanying drawing which illustrates one practical embodiment thereof to enable others familiar with the art to adopt and use the same, and will summarize in the claims the novel features of construction for which protection is desired.

Figure 3:
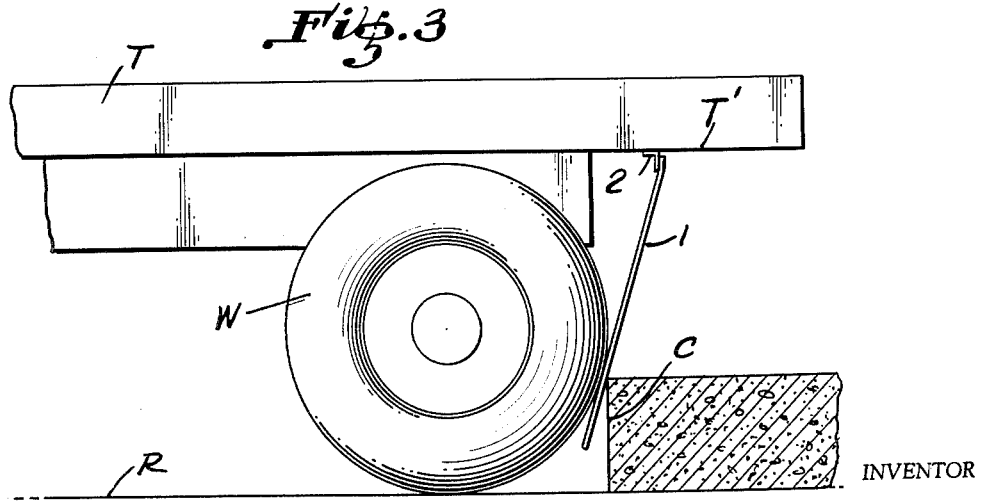
FIG. 3 is a side elevational view of the rear end of the truck provided with my novel mud flap, showing the wheel of the truck backing into a curbing with the mud flap disposed between the curbing and rear wheel.

As shown in FIG. 3, the truck body T is of ordinary construction having a bottom T', the truck body being supported upon wheels W in the usual manner; and a mud flap 1 of substantially rectangular shape is secured to the bottom T' in rear of the wheels W by means of an angle clip 2 or the like, the mud flap being secured to the vertical leg of clip 2 and the horizontal leg being secured by bolts, screws or the like to the bottom T' of the truck body so that the mud flap normally hangs suspended from the bottom of the truck body immediately in rear of the wheel W.

Preferably the mud flap 1 is formed of a sheet of resilient rubber or formed of some other semi-rigid stretchable material capable of withstanding tearing stresses and is of such length that its lower edge normally terminates above the roadway R, which latter may be provided with a curbing C or the like against which the wheels W of the truck may be backed, as indicated in FIG. 3.

Figure 1:
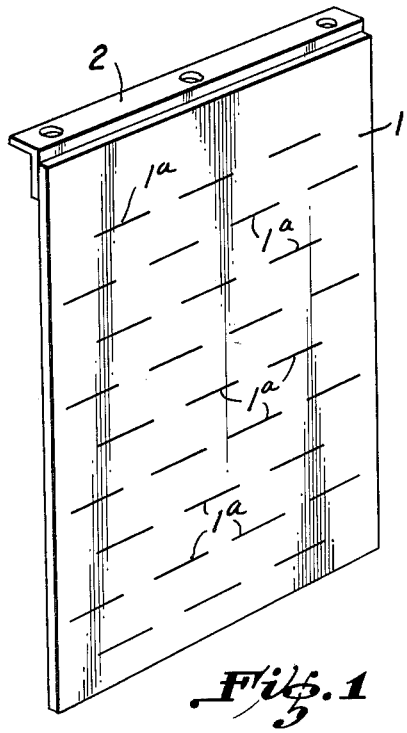
FIG. 1 is a front perspective view of my novel mud flap detached, showing the rows of normally closed offset slits horizontally disposed therein.
Figure 2:
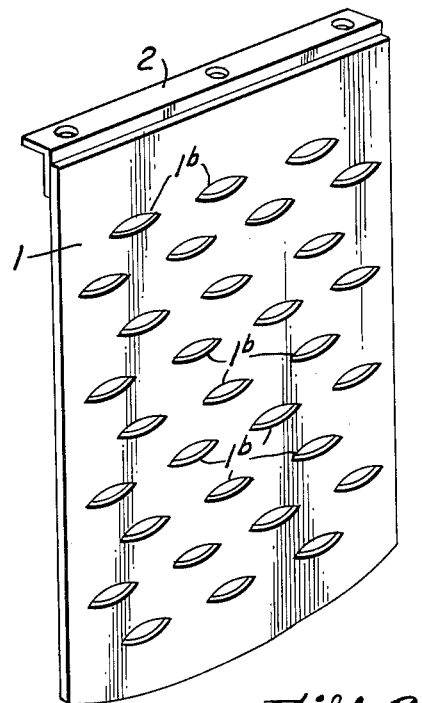
FIG. 2 shows the same mud flap in slightly elongated form, illustrating the shape of the openings therein resulting from said elongation.

The body of the mud flap 1 is provided with a series of horizontally disposed slits 1a as shown in FIG. 1, the slits in adjacent rows being offset or staggered as shown, so that if the flap should, through stresses, become stretched or elongated the slits would allow for such elongation and would on expansion in part, at least, temporarily under stress form holes 1b as shown in FIG. 2, which would however be sufficiently small in size as to be substantially impervious to rocks and gravel, and to a large extent impervious to water, owing to the small length of the slits 1a. However, as soon as the elongating stresses are removed, the body of the flap will resume its normal size and shape in which the slits 1a are closed. The provision of the slits 1a thus renders the flap sufficiently flexible so that it will not readily tear either at its weakest point which is the point of attachment to the angle clip 2, or at the point of squeeze between the curbing C and the wheel W, as indicated in FIG. 3.

Thus my mud flap will be durable and flexible, and will obviate the normal tendency of mud flaps heretofore used from becoming torn, wornout and from falling off the truck body, the main cause of such failure being the backing of the rear wheels W into curbing C or the like.

I do not limit my invention to the exact form shown in the drawing, for obviously changes may be made therein within the scope of the claims.

I claim:

1. In combination with a road vehicle having a body and having ground wheels; mud flaps suspended from the body adjacent and in rear of the said wheels, comprising a resilient sheet secured at its upper end to the underside of said body and terminating above the ground, said sheet having offset slits therein to permit elongation and flexing of the sheet under stresses to prevent tearing thereof while maintaining same substantially impervious to gravel and water.

2. In combination with a road vehicle having a body and having ground wheels; mud flaps suspended from the body adjacent and in rear of the said wheels, comprising a resilient sheet secured at its upper end to the underside of said body and terminating above the ground, said sheet having horizontally disposed rows of slits therein, the slits in adjacent rows being offset to permit elongation and flexing of the sheet under pinching and stretching stresses while preventing tearing thereof and while maintaining the sheet substantially impervious to gravel and water.

3. In a combination as set forth in claim 2, said sheet being connected to the vehicle body by means of angle clips and being capable of withstanding tearing stresses when the sheet is pinched between the said wheel and a fixed curbing or the like.

4. In combination with a road vehicle having a body and having ground wheels; mud flaps suspended from the body adjacent and in rear of the said wheels, comprising a substantially rectangular sheet of rubber secured at its upper end to the underside of said body and terminating above the ground, said sheet having horizontally disposed rows of slits therein, the slits in adjacent rows being offset to permit elongation and flexing of the sheet under pinching and stretching stresses to prevent tearing thereof while maintaining the sheet substantially impervious to gravel and water; and said sheet being capable of withstanding tearing stresses when the sheet is pinched between the said wheel and a fixed curbing or the like.

References Cited in the file of this patent

UNITED STATES PATENTS

| | | |
|---|---|---|
| 2,619,363 | Wenham et al. | Nov. 25, 1952 |
| 2,714,015 | Sherman | July 26, 1955 |